United States Patent [19]

Verwey et al.

[11] 4,041,853
[45] Aug. 16, 1977

[54] APPARATUS FOR ORGANIZING AND ARRANGING BUNDLES INTO STACKS

[75] Inventors: William G. A. Verwey, Phoenix; Stephen Stanton, Baltimore, both of Md.

[73] Assignee: Precision Industries, Inc., Baltimore, Md.

[21] Appl. No.: 632,583

[22] Filed: Nov. 17, 1975

[51] Int. Cl.² .............................................. B65B 13/18
[52] U.S. Cl. .......................................... 100/4; 100/7; 214/60 K
[58] Field of Search ..................... 100/4, 7; 214/6 DK, 214/6 P

[56] References Cited
U.S. PATENT DOCUMENTS

| | | | |
|---|---|---|---|
| 2,959,273 | 11/1960 | Sykes | 100/7 |
| 3,054,516 | 9/1962 | Joa | 214/6 DK |
| 3,312,357 | 4/1967 | Stephens | 214/6 DK |
| 3,429,459 | 2/1969 | Paul | 214/6 DK |
| 3,554,388 | 1/1971 | Thompson | 214/6 DK |
| 3,567,046 | 3/1971 | Reist | 214/6 DK |
| 3,618,550 | 11/1971 | Mojden | 214/6 DK |
| 3,624,782 | 11/1971 | McPeek | 214/6 DK |
| 3,827,577 | 8/1974 | Kurk | 214/6 DK |

*Primary Examiner*—Billy J. Wilhite

*Attorney, Agent, or Firm*—Lerner, David, Littenberg & Samuel

[57] ABSTRACT

An apparatus is provided for organizing and arranging bundles, preferably bundles of folded or unfolded corrugated boxes or blanks, into stacks which include a plurality of layers. The apparatus includes a vertical conveyor for supplying bundles to a loading station, at which one or more operators or mechanical arms are located, which function to remove the bundles for the loading station and to position them in a desired pattern on a horizontally movable support to form a layer. After a complete layer is formed, the support is removed from beneath the layer so that the layer of bundles is deposited on a stack-forming device which includes a vertically movable platform which is incrementally actuated downwardly each time another layer is deposited thereon to form the stack. The formed stack is then discharged from the stack-forming device and straps are applied thereto. Actuating means are provided for removing the support from beneath each formed layer and for lowering the stack-forming device after the stack is formed. The output of the actuating means is supplied to a programmer which in turn regulates the speed of the vertical conveyor to control the rate of supply of bundles to the loading station so that it is synchronized with the rate at which bundles are arranged into layers to form stacks to thereby avoid jam-ups or slow-downs in the system.

20 Claims, 2 Drawing Figures

APPARATUS FOR ORGANIZING AND ARRANGING BUNDLES INTO STACKS

FIELD OF THE INVENTION

The present invention relates generally to material-handling apparatus and specifically to a control arrangement for controlling the material-handling apparatus so as to coordinate the various functions.

BACKGROUND OF THE INVENTION

In recent years, complex systems have been developed for performing various material-handling functions. For example, a number of different "palletizing" systems have been developed for handling bundles or articles and forming them into stacks on pallets. In particular, in the box-folding industry, corrugated board and boxes are folded into a flat configuration and then stacked to form bundles, which may be either loose or tied. The bundles are then arranged into layers in any desired pattern and then the layers are stacked on a pallet for shipment.

Typically, the bundles are supplied by a folding or stitching machine and are manually placed on the palletizing apparatus. The palletizing apparatus may include a loading station where material handlers arrange the bundles into layers to form stacks. Once the stack is formed, it is discharged to another station where it may be readied for shipment.

One problem which has developed with such systems is coordinating the various functions to be performed so that the bundles to be formed into stacks pass through the material-handling system at the most efficient speed, while at the same time avoiding jam-ups or slow-downs in the system. For example, if the bundles are supplied too slowly to the palletizer, time will be lost, and the output and efficiency of the system will be low. However, if the bundles are supplied to the palletizer at too high of a rate, jam-ups will occur. Of course, the highest possible operating speed is limited by the number of bundles which can be handled at the palletizing or loading station per unit of time. Accordingly, the supply of bundles should be regulated to supply the optimum number of bundles to the palletizer which may be efficiently handled and which will avoid jam-ups or slow-downs in the system.

Moreover, in such systems, the number of bundles per layer varies, usually with the size and configuration of the bundles. In addition, the number of layers which may be formed into a stack also varies with the size and configuration of the bundles. Therefore, the number of bundles per stack is varied in accordance with the size and configuration of the bundles and a number of other variables. When the system is handling smaller bundles, more bundles may be included in each stack so that the speed at which bundles are supplied to the system may be increased. However, if the bundles are relatively large, the number of bundles per stack will be lower so that it will be necessary to supply the bundles at a slower rate. Accordingly, considering such factors, it would be desirable to provide an arrangement whereby the rate of supply of bundles to the palletizer may be regulated or adjusted in accordance with bundle size, stack size, and various other factors. In this manner, bundles may be supplied to the system at the optimum speed in accordance with the size and configuration of the bundles to be organized and arranged into stacks.

Broadly, it is an object of the present invention to provide a system and control therefor which overcomes one or more of the aforesaid problems. Specifically, it is within the contemplation of the present invention to provide a material-handling system which includes a manual or automatic control arrangement for coordinating the various functions of supplying bundles to a loading station, arranging the bundles into layers, forming the layers into stacks on pallets, strapping the stacks onto a pallet, and discharging the loaded pallet ready for shipment.

It is a further object of the present invention to provide a material-handling system in which the functions are coordinated to provide a system that operates at the optimum speed and which may be varied in accordance with the size and configurations of the bundles to be stacked or palletized.

It is a still further object of the present invention to provide a material-handling system in which the rate at which bundles are supplied to a loading station is synchronized with the rate at which bundles are arranged into layers to form stacks, in order to operate the system at its maximum capacity, without jam-ups or slow-downs occurring in the system.

SUMMARY OF THE INVENTION

Briefly, in accordance with the principles of this invention, an improved material-handling system is provided for organizing and arranging articles, such as bundles of folded, corrugated boards or boxes, into stacks. More particularly, the system includes an input conveyor, such as a vertical conveyor, for supplying the bundles to a loading station. The vertical conveyor is also provided with a drive arrangement which includes a clutch-brake controller to intermittently stop the vertical conveyor so that it may receive the bundles to be supplied to the loading station. Alternatively, an SCR drive may be employed to regulate the speed of the vertical conveyor. The bundles received at the loading station may be either manually or automatically arranged into a desired pattern to form a layer on a supporting means, which is movable between a retracted and an extended position. After the desired number of bundles have been arranged to form a layer on the supporting means, it is actuated to an extended position so that the layer may be deposited on a pallet or a previously-formed layer, and the supporting means is then returned to its retracted position so that the next layer may be formed thereon. The successive layers are deposited onto a stack-forming means which is movable between a receiving position and a transfer position. The stack-forming means lowers incrementally a distance equal to or greater than the height of a layer of bundles each time an additional layer is placed thereon. When the desired number of layers have been deposited on the stack-forming means, the formed stack is ready to be discharged. The stack-forming means includes a discharge conveyor which is operated automatically to discharge the formed stack to the next station where it is readied for shipment. Such station may include a strapping head for applying straps to the stack of bundles to be shipped. The stack-forming means is then returned from the transfer position to its receiving position where it is ready to receive the next layer of bundles to be deposited thereon and to form the next pallet load.

The system also includes a first actuating means for actuating the supporting means to its extended position so that each layer formed thereon is deposited on a pallet or the previously formed layer on the stack-forming means. In addition, a second actuating means is also provided for acutating the stack-forming means to its transfer position so that the formed stack may be discharged. The first and second actuating means may be in the form of push buttons which are manually operable or, alternatively, the first and second actuating means may include first and second counters and programmers: the first programmer for actuating the supporting means to its extended position automatically each time a layer is formed, and the second programmer for actuating the stack-forming means to its transfer position each time a stack has been formed and is ready to be discharged. The output of the first and second actuating means (or of the first and second programmers) is supplied to a third programmer for regulating the speed of the driving means of the input vertical conveyor to control the rate of supply of bundles to the loading station. In this manner, the speed of the vertical conveyor is synchronized and coordinated with the number of bundles to be included in a layer and the number of layers to be included in a stack.

More particularly, in the manual embodiment, the first actuating means is actuated by the operator each time a layer of bundles has been arranged on the supporting means to move it to the extended position. In addition, the second actuating means is actuated by the operator each time the desired number of layers has been formed into a stack to transfer it to the transfer position. Each time the first and second actuating means are actuated, signals are supplied to the third programmer which employs these signals to regulate the speed of the input vertical conveyor to thereby control the rate of supply of bundles to the loading station. In this manner, the rate at which bundles are supplied to the loading station is synchronized with the rate at which the operator arranges the bundles into layers to form stacks.

In the automatic embodiment, the first and second actuating means include first and second counters and programmers (instead of push-buttons), respectively. The first programmer is set to actuate the supporting means to its extended position each time the desired number of bundles is automatically placed and arranged into a layer on the supporting means. The first programmer may be operated by a first counter which counts the number of bundles placed on the supporting means. In addition, the second programmer is set to actuate the stack-forming means to its transfer position each time the desired number of layers has been deposited thereon to form a stack. A second counter is employed to count the number of layers deposited on the stack-forming means, and the output of the second counter is employed to signal the second programmer to actuate the stack-forming means to its transfer position so that the formed stack may be discharged. As explained above with respect to the manual embodiment, each time the first and second programmers operate to actuate the supporting means and the stack-forming means, signals are supplied to the third programmer which operates to regulate the speed of the input vertical conveyor to thereby control the rate of supply of bundles to the loading station. In this manner, the rate at which bundles are supplied to the loading station is synchronized with the rate at which bundles are automatically arranged into layers to form stacks, so that the system is operated at its maximum capacity, without having jam-ups or slow-downs occur in the system.

The system also includes a sensor disposed at the extended position of the supporting means to actuate the stack-forming means downwardly each time a layer of bundles is deposited thereon, i.e., when the supporting means is moved to its extended position. In addition, a sensor is disposed at the retracted position for returning the supporting means to its retracted position and for stopping downward movement of the stack-forming means after each layer is received.

The system also includes sensors for detecting jams at various locations in the system which operate to de-energize or shut off the input vertical conveyor.

BRIEF DESCRIPTION OF THE DRAWINGS

Further objects, features, and advantages of the present invention will become apparent upon the consideration of the following detailed description of a presently preferred embodiment when taken in conjunction with the accompanying drawing, wherein.

DETAILED DESCRIPTION OF PREFERRED EMBODIMENTS OF THE INVENTION

Figure 1:
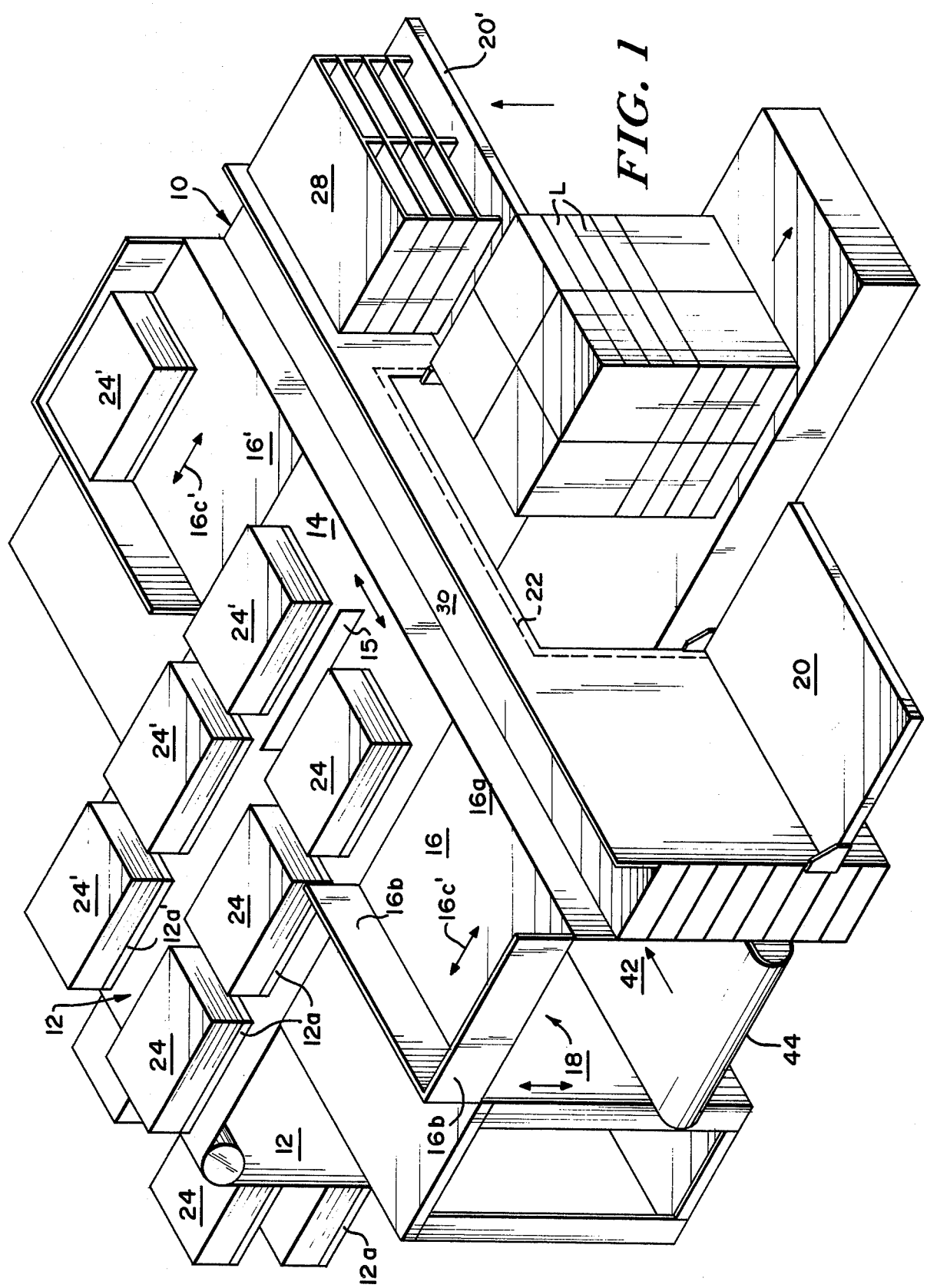
FIG. 1 is a perspective view of the overall material-handling system which includes the input vertical conveyor, the loading station, the supporting means, the stack-forming means, and the discharge conveyor.

Referring now to FIG. 1, there is shown the material-handling system of the present invention, generally designated by the reference numeral 10, which includes an input conveyor 12 for feeding bundles 24 to a loading table or loading station 14, movable supporting means 16 and 16' which are identical and on which bundles 24 and 24' are arranged in a desired pattern to form a layer, stack-forming means 18 and 18' (not shown) which are also identical and are adapted to receive layers L of bundles 24 deposited thereon by movable supporting means 16 and 16', pallet-feeding means 20, 20' which are identical for feeding pallets 28 to stack-forming means 18 and 18', and strap-applying means 22 for applying straps to the formed stack discharged from stack-forming means 18 or 18'.

The material-handling system 10, shown in FIG. 1, is illustrated supplying two parallel lines of bundles 24 and 24' to loading station 14, the line of bundles 24 being diverted to movable supporting means 16 and stack-forming means 18, while the line of bundles 24' is diverted to movable supporting means 16' and stack-forming means 18' (not shown but identical to stack forming means 18). Although the material-handling system 10 of the present invention has been illustrated for handling parallel lines of bundles 24 and 24' and forming them into stacks, it should be understood that the present invention is also applicable to only a single line of bundles 24 with the material-handling system 10 including only movable supporting means 16 and stack-forming means 18, the corresponding primed parts not being required. However, in certain applications of the present invention which require the handling of a large number of bundles, the principles of the present invention can be employed to increase efficiency and to simultaneously supply and form into stacks two lines of bundles, as shown in FIG. 1. For ease of consideration, the material-handling system 10 will be described without referring specifically to the primed components, it being understood that their operation is identical to the correspondingly numbered parts.

In the preferred embodiment of the present invention, bundles 24 include a stack of folded corrugated boxes or boards which may either be stacked in a loose manner or tied into bundles. However, it should be understood that the present invention has application to other types of bundles or articles to be transferred and formed into stacks and loaded onto pallets.

The input conveyor 12 is preferably a vertical conveyor having horizontally-extending support members 12a for receiving bundles 24 from an in-line device, such as a folding machine (not shown), and for transferring them to loading station 14. Support members 12a of vertical conveyor 12 are constructed and arranged to remain in a horizontally-extending position from the time they receive bundles 24 until they are transferred to loading station 14 so that bundles 24 are always maintained in an upright position. As will be explained, vertical conveyor 12 is driven and controlled by drive means 50 (see FIG. 2). The vertical conveyor 12 and its constructional details need not be discussed further, as such a vertical conveyor, having horizontally-disposed members which always maintain the transferred article upright, may be of a conventional type.

Vertical conveyor 12 transfers bundles 24 to loading station 14, which may include a flat and horizontally-extending platform or surface. The loading station 14 should be large enough to receive and support a back-up of at least two or more bundles 24. In this manner, the system will not be required to immediately transfer each bundle 24 to movable supporting means 16 as soon as it is received from vertical conveyor 12.

Bundles 24, which accumulate at loading station 14, are organized and arranged into desired patterns on movable supporting means 16 to form a layer L. Bundles 24 may be transferred to movable supporting means 16 either manually, by one or more operators disposed on a ramp 30, or automatically by a mechanical transfer arm 15 which is movable along loading station 14 to transfer bundles 24. Such mechanical arms may be of the overhead type or may extend through the surface of loading station 14 and engage a bundle 24 to slide it onto movable supporting means 16. In addition, the mechanical arms may be manipulated to turn bundles 24 in order to organize and arrange them in the desired pattern on movable supporting means 16. Such material transfer arms and mechanical turning arms for automatically transferring bundles 24 from loading station 14 and for arranging them on movable supporting means 16 may also be of the conventional type.

The movable supporting means 16 includes means for supporting bundles 24 transferred from loading station 14 to form a layer L and includes a reversible motor and drive means 32 (see FIG. 2) to move supporting means 16 between a retracted and an extended position. The movable supporting means 16 preferably includes a flat, horizontally-extending platform or surface 16a having corner guides 16b, against which bundles 24 may be arranged. As shown in FIG. 1, the movable supporting means 16 is in its retracted position, and may be actuated either manually or automatically (as will be explained) in the direction of arrow 16c to its extended position by reversible drive means 32. The movable supporting means 16 also includes a stripper plate (not shown) for stripping bundles 24 from the platform 16a of movable supporting means 16 when it is moved to its extended position so that the layer L of bundles 24 may be deposited onto stack-forming means 18.

Stack-forming means 18 is adapted to receive an empty pallet 28, and each layer L of bundles 24 which is formed on supporting platform 16a is deposited onto pallet 28 or the preceding layer L to form a stack of layers. Stack-forming means 18 includes an upper surface or platform 42 and a drive 40 (see FIG. 2) for driving platform 42 between a receiving and a transfer position. As will be explained below, stack-forming means 18 is moved from its receiving position incrementally towards its transfer position each time a layer L of bundles 24 is deposited thereon by movable supporting means 16. In this manner, as each layer L of bundles is deposited on platform 42, drive 40 operates to move platform 42 downwardly a distance equal to the height of the bundles, so that platform 42 is then ready to receive the next layer L from movable supporting means 16. When the desired number of layers have been deposited on pallet 28 in stack-forming means 18, the completed load is moved to the transfer position and then is ready to be discharged from stack-forming means 18.

Accordingly, the stack-forming means 18 also includes a discharge conveyor 44 which is operated, either manually or automatically (as will be explained), to move between the transfer position and a discharge position to discharge the loaded pallet to the next station where it is readied for shipment. The platform 42 forms the upper surface of discharge conveyor 44 which is merely a conventional conveyor and which is driven by a motor and drive arrangement 46 (see FIG. 2).

The system also includes at the next station a conventional strapping machine for applying straps to the loaded pallet which is at the discharge position and is ready to be shipped. Once the loaded pallet is discharged to the strap-applying station 22, the stack-forming means 18, including platform 42, is then returned to the receiving position where it is ready to receive the next layer L of bundles 24 to be deposited thereon to form the next stack.

The system also includes pallet-feeding means 20 for manually or automatically supplying pallets 28 to the transfer position of platform 42 after each formed stack has been discharged.

Figure 2:
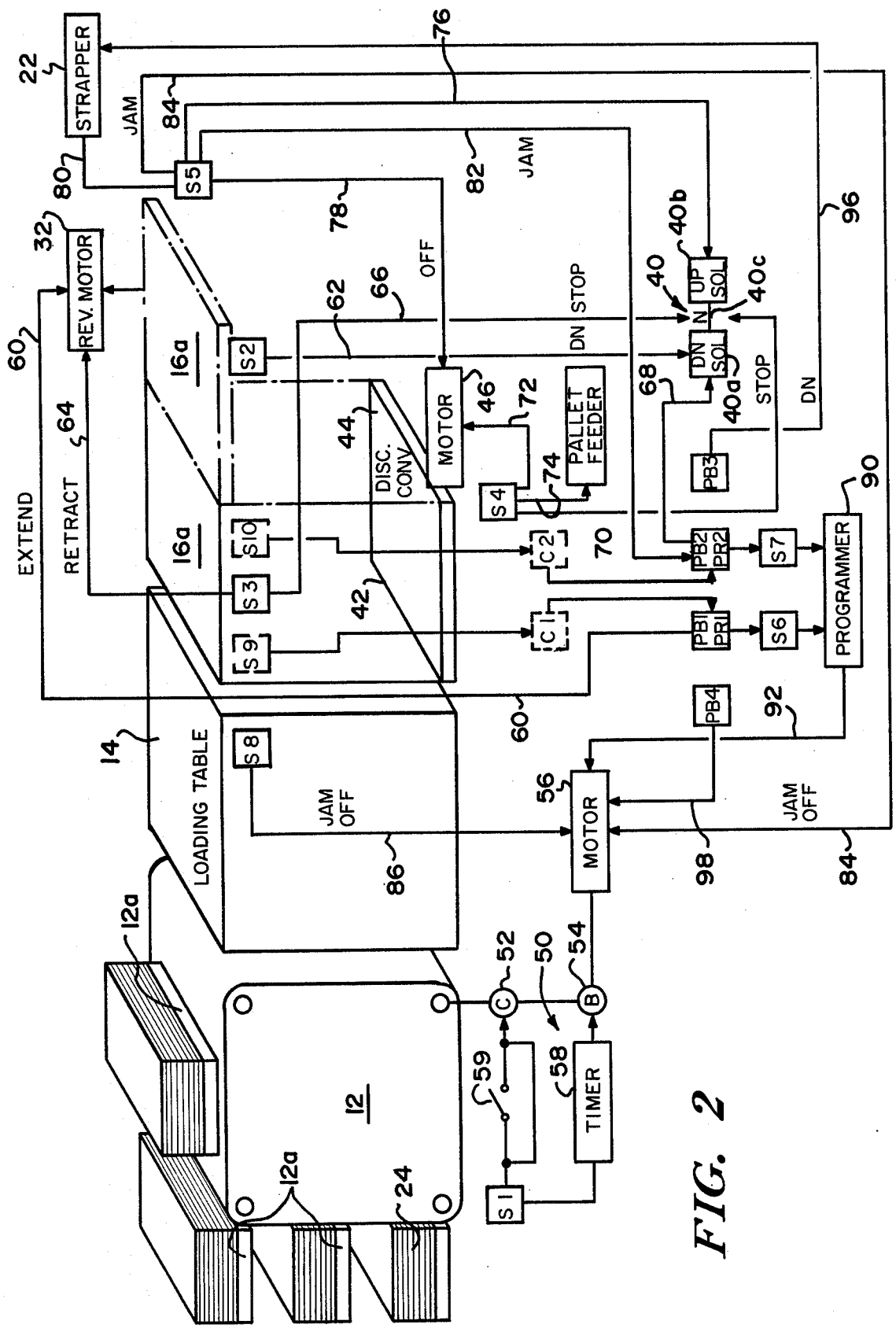
FIG. 2 is a schematic representation of the overall control circuit for coordinating the various functions of the system.

Referring now specifically to FIG. 2, there is shown the overall control circuit for controlling and coordinating the various functions of the material-handling system 10. For ease of consideration, this control circuit is illustrated for controlling only a single line of bundles 24 as they are supplied from vertical conveyor 12, but is to be understood that the control circuit could be duplicated to simultaneously receive and form into stacks, two parallel lines of bundles 24, 24' as they are supplied from vertical conveyor 12.

As shown in FIG. 2, driving means 50 for vertical conveyor 12 includes a clutch 52, a brake 54, and a motor 56. A photoelectric sensor S1 is also disposed at the input end of vertical conveyor 12 which senses each time a bundle 24 is received on support member 12a. Each time the light beam from sensor S1 is interrupted, it sends a signal to clutch 52 to engage and drive vertical conveyor 12. Simultaneously, sensor S1 sends a signal to timer 58 causing brake 54 to be actuated after a short delay. As a result, vertical conveyor 12 is stopped so that the next support member 12a may receive the next bundle 24. In this manner, motor 56 and clutch-brake arrangement 52, 54 operate to intermittently drive vertical conveyor 12 so that each support member 12a receives a bundle 24 and transfers it to loading station 14. Switch 59 operates to allow the vertical conveyor 12 to be cleared at the end of a cycle.

As explained above, from loading station 14, bundles 24 are manually or automatically organized and arranged on supporting platform 16a. A first actuating means, push-button PB1, is provided for actuating supporting platform 16a to its extended position so that each layer L formed thereon may be deposited on a pallet 28 or the previously formed layer already deposited on the stack-forming means 18. Push-button PB1 operates through lead 60 to energize the reversible drive and motor 32 to actuate supporting platform 16a to its extended position (shown in dotted lines in FIG. 2). A sensor S2 is disposed at the extended position for energizing the down solenoid 40a of drive 40 via lead 62 each time platform 16a is actuated to the extended position. The down solenoid 40a operates to move the platform 42 of stack-forming means 18 incrementally toward the transfer position after each layer L of bundles is deposited thereon. In this manner, platform 42 is lowered a distance equal to the height of bundles 24 so that it is ready to receive the next layer of bundles deposited thereon. A sensor S3 is disposed at the retracted position of supporting platform 16a, and when its light beam is no longer interrupted by the layer L which has been moved downwardly, it operates to actuate reversible motor 32 via lead line 64 to retract supporting platform 16a to its retracted position so that it is ready to receive the next layer of bundles to be arranged thereon. In addition, sensor S3 operates via lead line 66 connected to the neutral position 40c to de-energize driving means 40 after bundles 24 have cleared the sensor S3 so that platform 42 is stopped after it has traversed a distance equal to the height of bundles 24.

After a series of layers L of bundles 24 have been stacked on pallet 28 on platform 42 to form a stack of a desired height, the loaded pallet is ready to be discharged by discharge conveyor 44. The operator actuates a push-button PB2 to drive platform 42 downwardly until it reaches the transfer position via lead 68 connected to down solenoid 40a. A sensor S4 disposed at the transfer position senses when platform 42 reaches the transfer position and operates via lead 70 connected to the neutral position 40c to de-energize during means 40. In addition, sensor S4 operates via lead 72 to energize motor 46 to drive discharge conveyor 44. The discharge conveyor 44 operates to transfer loaded pallet 28 from the transfer position to the discharge position for discharging the loaded pallet to strap-applying means 22, where it is readied for shipment. After a delay, sensor S4 operates to energize the pallet feeder 20 via lead 74 to supply a new pallet 28 to platform 42 so that it may receive and form the next stack of layers.

A sensor S5 is disposed at the discharge position and operates when the loaded pallet 28 passes sensor S5 to deenergize motor and drive 46 via lead 78 to discontinue the operation of discharge conveyor 44, since the loaded pallet has been discharged therefrom. Simultaneously, when the loaded pallet 28 passes sensor S5, it energizes the up solenoid 40b of drive means 40 via lead 76 to return stack-forming means 18 and platform 42 from the transfer position to the receiving position so that it is ready to receive the next layer of bundles 24 to be deposited thereon. In addition, when the loaded pallet 28 is received at the discharge position, sensor S5 also energizes strap-applying means 22 via lead 80 to apply straps to and suitably tie the formed stack so that it is ready for shipment. Any conventional strap-applying means may be employed for this purpose.

Suitable jam detection devices have also been incorporated into the material-handling system 10 of the present invention. For example, if a stack to be tied becomes stuck in the strap-applying means 22, and is not removed therefrom within a predetermined number of seconds, sensor S5 will operate via lead 82 to de-energize push-button PB2 so that it cannot be operated to energize the down solenoid 40a of driving means 40. In this manner, sensor S5 prevents an additional stack of bundles 24 from being discharged into the strip-applying means 22 when a previous stack has been delayed therein. In addition, a push-button PB3 is provided at the operator station and is connected via line 96 to strapper 22 so that it may be de-energized by the operator if any jam-ups occur in the strapper.

An additional jam detection device is also provided. More particularly, if sensor S5 does not sense a pallet load being received in the discharge position within a predetermined time, it will operate via lead 84 to de-energize motor 56 so that vertical input conveyor 12 will no longer be driven. As a result, bundles 24 will not be supplied to the material-handling system 10 until the jam-up is cleared.

A still further jam detection device is also provided in the present system. More particularly, a sensor S8 is disposed at loading station 14 which senses when three or more bundles 24 have been accumulated at loading station 14. As a result, the bundles back up and block sensor S8 which operates to immediately stop motor 56 and input vertical conveyor 12 to discontinue the supply of bundles 24 therefrom. In addition, a push-button PB4 is provided at the operator station and is connected via line 98 directly to motor 56 so that conveyor 12 may be de-energized by the operator if any jam-ups occur.

In this manner, jam detection devices have been provided at each critical point in the material-handling system 10 of the present invention to insure that the system does not continue to operate if jam-ups have occurred at loading station 14, at strap applying means 22, or if loaded pallets are not being received at the discharge position within predetermined time periods.

The material-handling system 10 of the present invention also includes means for controlling the rate at which bundles 24 are supplied to the loading station 14 and synchronizing this rate with the rate at which the operator or operators at ramp 30 arrange the bundles 24 into layers and stacks. More particularly, each time push-buttons PB1 and PB2 are actuated by the operator, signals are supplied to sensors S6, S7, respectively. In addition, the output of sensors S6, S7 is supplied to a programmer 90 which employs these signals to regulate the speed of motor 56 in a predetermined manner. As a result, the speed of vertical conveyor 12 is regulated to control the rate of supply of bundles 24 to the loading station 14, which rate will be synchronized with the operation of push-buttons PB1 and PB2 by the operators. It will be understood, of course, that programmer 90 includes predetermined programs for determining when the speed of motor 56 should be increased or decreased. For example, programmer 90 is arranged to include three motor speed controls: slower, normal, and faster. Accordingly, if signals are supplied from sensors S6, S7 at a normal rate, motor 56 will not be adjusted, since the system is properly synchronized and is operating at the desired rate. However, if signals are being received from sensors S6, S7 too often, programmer 90 will operate to slow down motor 56 to a predetermined rate until the signals from sensors S6, S7 are again received at the normal rate. Similarly, if the signals from sensors S6, S7 are being received too slowly, programmer 90 will operate to speed up motor 56 to a predetermined rate until signals are again received from sensors S6, S7 at the normal rate. In this manner, the rate at which bundles 24 are supplied to the loading station 14 is continuously synchronized with the rate at which the operator at ramp 30 arranges the bundles 24 into layers and stacks.

In another embodiment, bundles 24 are transferred onto supporting platform 16a automatically by transfer arm 15, rather than manually by operators. Accordingly, the first and second actuating means, in such an embodiment, include first and second programmers PR1 and PR2 in place of push-buttons PB1 and PB2, respectively. The first programmer, PR1, via lead 60, is set to actuate the supporting means 16 to its extended position automatically each time the desired number of bundles 24 is automatically placed and arranged into a layer on supporting platform 16a. Programmers PR1 may be operated by a counter C1 (shown in dotted lines) which counts the number of bundles 24 formed into a layer on supporting platform 16a. Signals are supplied to counter C1 by a sensor S9 disposed adjacent loading station 14 which is actuated each time a bundle is transferred to platform 16a. In addition, the second programmer PR2 automatically actuates the stack-forming means 18 to its transfer position via lead 68 each time the desired number of layers has been deposited on platform 42. A second counter C2 (shown in dotted lines) is employed to count the number of layers deposited on platform 42, and the output of counter C2 is employed to signal programmer PR2 to actuate platform 42 to its transfer position so that the formed stack may be discharged. Signals are supplied to counter C2 by a sensor S10 disposed on stack-forming means 18 which is actuated each time a layer is deposited on platform 42.

As explained above with respect to the manual embodiment, each time programmers PR1 and PR2 operate to actuate the supporting means 16 and the stack-forming means 18, respectively, signals are supplied to sensors S6 and S7. These signals are in turn supplied to programmer 90 which operates, as explained above, to regulate the speed of vertical conveyor 12 to thereby control the rate of supply of bundles 24 to loading station 14. In this manner, the rate at which bundles are supplied to the loading station 14 will be synchronized with the rate at which bundles 24 are automatically arranged into layers to form stacks, so that the system is operated at its maximum capacity. Advantageously, the bundles 24 are supplied to the loading station 14 at the maximum rate at which they can be transferred to the movable supporting means 16 and arranged into the desired layers and stacks. Such synchronization within the material-handling system 10 of the present invention will avoid slow-downs or jam-ups from occurring in the system.

A latitude of modification, change and substitution is intended in the foregoing disclosure and, in some instances, some features of the invention will be employed without a corresponding use of other featues. Accordingly, it is appropriate that the appended claims be construed broadly and in a manner consistent with the spirit and scope of the invention herein.

What is claimed is:

1. Apparatus for organizing and arranging bundles into stacks, comprising:
    means responsive to a first control signal for supplying bundles to a loading station, said supplying means including a conveyor having support members which remain horizontally disposed while transferring a bundle to said loading station;
    means for receiving and supporting bundles from said loading station to form a layer of bundles, said receiving and supporting means being responsive to a second control signal to move between a retracted and an extended position;
    stack-forming means mounted below said receiving and supporting means for receiving layers from said receiving and supporting means when said receiving and supporting means is retracted to form a stack of bundles from said layers, said stack-forming means being responsive to a third control signal to move between a receiving and a transfer position;
    first actuating means for supplying said second control signal to said receiving and supporting means to move it to said extended position so that each layer formed thereon is deposited on said stack-forming means to form a stack;
    second actuating means for supplying said third control signal to said stack-forming means so that said formed stack is transferred to said transfer position so that said formed stack may be discharged; and
    third actuating means for supplying said first control signal to said supplying means to control the rate of supply of bundles to said loading station so that it is synchronized with the rate at which bundles are arranged into layers to form stacks.

2. Apparatus in accordance with claim 1 wherein said third actuating means is responsive to the output of said first and second actuating means for supplying said first control signal to said supplying means.

3. Apparatus in accordance with claim 1 further including: first sensor means disposed at said extended position being responsive to said receiving and supporting means being moved to said extended position for moving said stack-forming means towards said transfer position after each layer is deposited thereon, and
    second sensor means disposed at said retracted position being responsive to said topmost layer on said stack-forming means clearing said second sensor means for retracting said receiving and supporting means and for stopping said stack-forming means after it has moved a distance at least equal to the height of said bundles so that it is ready to receive another layer or to be moved to said transfer position.

4. Apparatus in accordance with claim 1 wherein:
    said stack-forming means includes a discharge conveyor being responsive to a fourth control signal to move between said transfer position and a discharge position for discharging said formed stack from said stack-forming means, and
    sensor means disposed at said transfer position being responsive to said stack-forming means being moved to said transfer position for supplying said fourth control signal to said stack-forming means for stopping said stack-forming means at said transfer position and to said discharge conveyor for moving said discharge conveyor to said discharge position so that said formed stack is discharged from said stack-forming means.

5. Apparatus in accordance with claim 4 further including means for feeding an empty pallet onto said discharge conveyor, and said sensor means disposed at said transfer position being responsive to said stack being discharged for actuating said pellet-feeding means to feed an empty pallet onto said discharge conveyor.

6. Apparatus in accordance with claim 4 further including:
sensor means disposed at said discharge position being responsive to said formed stack being discharged for de-energizing said discharge conveyor, and
said sensor means at said discharge position being responsive to said formed stack being discharged for returning said stack-forming means to said receiving position.

7. Apparatus in accordance with claim 6 further including:
strap-applying means arranged at said discharge position for applying straps to said discharge stack, and
said sensor means disposed at said discharge position being responsive to said formed stack being discharged for actuating said strap-applying means.

8. Apparatus in accordance with claim 7 wherein said sensor means disposed at said discharge position is responsive to a stack being jammed in said strap-applying means for de-energizing said second actuating means to prevent operation of said discharge conveyor and thereby prevent another stack from being transferred into said discharge position.

9. Apparatus in accordance with claim 6 wherein said sensor means disposed at said discharge position is responsive to a formed stack not passing said sensor means within a predetermined time period for de-energizing said supplying means to discontinue the supply of bundles to said loading station.

10. Apparatus in accordance with claim 1 further including sensor means disposed at said loading station being responsive to a jam-up of bundles for stopping said supplying means to discontinue the supply of bundles to said loading station.

11. Apparatus in accordance with claim 1 wherein said conveyor is vertical.

12. Apparatus in accordance with claim 11 wherein said supplying means further includes a clutch-brake controller and a timer for controlling the time during which the brake of said clutch-brake controller is engaged to stop movement of said vertical conveyor so that a bundle may be received on one of said support members.

13. Apparatus in accordance with claim 12 further including a sensor being disposed at said vertical conveyor which is responsive to a bundle being received on one of said support members for engaging the clutch of the clutch-brake controller to drive said vertical conveyor.

14. Apparatus in accordance with claim 1 wherein said receiving and supporting means includes a horizontally movable platform and a reversible drive means for moving said platform between said retracted and extended positions.

15. Apparatus in accordance with claim 1 wherein said stack-forming means includes a receiving platform and drive means for moving said receiving platform either incrementally or continuously between said receiving and transfer positions.

16. Apparatus in accordance with claim 1 wherein said third actuating means includes a programmer having predetermined settings for controlling said supplying means, the selection of said settings being controlled by the output of said first and second actuating means.

17. Apparatus in accordance with claim 1 wherein said first actuating means includes a first programmer and counter for counting the number of bundles formed into a layer on said receiving and supporting means and for supplying said second control signal to said receiving and supporting means.

18. Apparatus in accordance with claim 1 wherein said second actuating means includes a programmer and counter for counting the number of layers formed into a stack on said stack-forming means and for supplying said third control signal to said stack-forming means.

19. Apparatus in accordance with claim 1 further including means for transferring said bundles from said loading station to said receiving and supporting means.

20. Apparatus in accordance with claim 1 further including means for sensing operation of said first and second actuating means, said means for supplying said first control signal being responsive to said sensing means.

* * * * *

UNITED STATES PATENT OFFICE
CERTIFICATE OF CORRECTION

Patent No. 4,041,853                    Dated August 16, 1977

Inventor(s) William G.A. Verwey, Stephen Stanton

It is certified that error appears in the above-identified patent and that said Letters Patent are hereby corrected as shown below:

Column 5, line 48, change "material" to -- mechanical --.

Column 7, line 47, change "during" to -- driving --.

Column 8, line 14, change "strip" to -- strap --.

Signed and Sealed this

Sixth Day of December 1977

[SEAL]

Attest:

RUTH C. MASON
*Attesting Officer*

LUTRELLE F. PARKER
*Acting Commissioner of Patents and Trademarks*